United States Patent [19]

Hodge

[11] Patent Number: 5,039,043
[45] Date of Patent: Aug. 13, 1991

[54] POST HOLDER

[76] Inventor: Robert B. Hodge, 369 Kubli Rd., Grants Pass, Oreg. 97527

[21] Appl. No.: 504,935

[22] Filed: Apr. 5, 1990

[51] Int. Cl.$^5$ ............................................. A47G 29/00
[52] U.S. Cl. .................................... 248/125; 248/411; 403/104; 403/362
[58] Field of Search ....................... 248/125, 411, 413; 403/104, 362, 377, 366

[56] References Cited

U.S. PATENT DOCUMENTS

| | | | |
|---|---|---|---|
| 2,339,615 | 1/1944 | Castelli | 403/362 X |
| 2,503,738 | 4/1950 | Horton | 403/362 |
| 3,203,668 | 8/1965 | Pitsenbarger | 403/104 X |
| 3,362,668 | 1/1968 | Reinhart | 248/125 |
| 4,140,415 | 2/1979 | Koyamato | 248/413 X |
| 4,419,026 | 12/1983 | Leto | 403/104 |
| 4,826,152 | 5/1989 | Lo | 403/362 X |
| 4,932,622 | 6/1990 | Hayakawa | 248/411 X |

FOREIGN PATENT DOCUMENTS

| | | | |
|---|---|---|---|
| 03562 | 6/1986 | PCT Int'l Appl. | 403/104 |
| 1454739 | 1/1989 | U.S.S.R. | 403/104 |

Primary Examiner—Gary L. Smith
Assistant Examiner—Michael Milano
Attorney, Agent, or Firm—Lyon & Lyon

[57] ABSTRACT

A post holder is provided with a breaking arrangement to hold a post without application or external force even under the influence of gravity. In the preferred embodiment, a post holder is provided with a shoe which contacts the post. The shoe is urged toward the post with a spring, in the preferred embodiment a single convolution spring. Preferably, the shoe has a relatively large face area contacting the post, thereby provide more positive locking of the post relative to the post holder with the application of lesser external force. Ideally, the spring applies sufficient force on the shoe that the post does not move under the force of gravity. In operation, the user may remove the external force, move the post relative to the post holder, and reapply an external locking force, at any time the post being supported by the breaking arrangement. In this way, the user may move the post relative to the post holder with a single hand.

8 Claims, 1 Drawing Sheet

POST HOLDER

FIELD OF THE INVENTION

This invention relates generally for holders for vertically oriented posts or poles, and particularly, for vertical post holders for use on optical tables.

BACKGROUND OF THE INVENTION

The need to vertically hold a post or pole against the force of gravity occurs in many situations. Two principle examples known to the prior art where some degree of precision is required include the use of mounting optical elements on optical tables and camera tripods. The discussion of the prior art and the structure and operation of the invention will focus principally on holders for vertically oriented posts in the optical field, though it applies to devices such as camera tripods.

Posts and post holder arrangements have been used in the prior art for precisely positioning optical components on an optical test table. Optical components, such as lenses, mirrors and lasers, must be precisely oriented with respect to each other both in height and angular orientation. Typically, the optical components are held in a holder and mounted on a post and post holder arrangement.

FIG. 1 shows a post and post holder as it would appear on an optical table or breadboard. The optical table 10 is a rigid table which bears an array of threaded holes 12 on its surface. An optical component, such as a lens 14 is held in a holder 16 which is in turn mounted on a post 20 having a threaded end (not shown) held in a post holder 22. The post holder 22 is attached to the table 10 via the threaded holes 12. Generally, such a post and post holder arrangement provide two degrees of freedom, vertical and rotational about the axis of the post holder.

Referring to FIG. 2, the post 20 is a cylindrical rod made of suitable hard and rigid material, such as stainless steel. The width of the rod for most optical applications is on the order of one-half inch. Any length of rod desired may be used, and typically various lengths of post 20 are available. The post holder 22 has a central bore whose inside diameter is slightly larger than the outside diameter of the post 20. Double bore post holders exist in which two slightly non-concentric bores are made in the post holder 22 to receive the post 20. The double bore arrangement provides a vertical channel on the inside of the post holder 22 across from the screw 24 to provide precise positioning of the post 20 relative to the post holder 22. The post 20 is held relative to the post holder 22 by the screw 24. A knob 26 permits manual tightening of the screw 24, and optionally, a hole for an Allen wrench is provided in the face of knob 26 for tightening with an Allen wrench. Typically the screw is one quarter inch in diameter and has 20 threads per inch. Accordingly, the contact area between the tip of the screw 24 and the post 20 is in a relatively small area. Scoring of post 20 is possible if the post is not hard enough or if excessive force, such as through the use of an Allen wrench, is used to tighten the screw.

In operation, the user loosens the screw 24 via the knob 26 to permit free movement of post 20 in the post holder 22. Typically, the screw 24 should be backed out sufficiently to prevent scoring or scratching of the surface of the post 20 by the end of the end of the screw 24. The post 20 is positioned both vertically and at the proper angular orientation relative to the other components on the table 10. Once in position, the screw 24 is tightened locking the post 20 into place. If a double bore arrangement has been provided, the screw 24 forces the post 20 into contact along two line contacts running vertically in the post holder 22. In this way, more precise repositioning in the plane of the table 10 may be achieved.

While the post and post holder arrangement of the prior art has been in extensive and wide spread use, it suffers from a number of serious drawbacks. Most particularly, when the screw 24 is loosened to permit adjustment of the post 20, the gravitational force on the post 20 will cause it to drop if not supported. Typically, repositioning of the post 20 requires the use of two hands, one to loosen the knob and the other to position the post 20. Further, manual positioning of the post does not always insure positional accuracy. Slight movements of the posts may occur prior to locking of the post. Various attempts have been made to overcome these problems. For example, if the only desired degree of freedom is rotational freedom of the post 20, a collar may be placed around the post 20 which sits on top of the post holder 22. In this way, when the screw 24 is removed no vertical motion takes place. This arrangement however does not permit vertical movement of the post.

Telescoping post mounts using a rack and pinion arrangement permit vertical positioning, but no degree of freedom for angular orientation.

Tripods are often made with chuck arrangements where a clamping force is applied to the post. These too suffer from the basic problem that when the external clamping force is removed sufficient that the post can move vertically, the action of gravity causes the post to fall unless restrained.

SUMMARY OF THE INVENTION

A post holder is provided with a shoe which is urged towards a post. A post is held in place by the force from the shoe, even under the influence of gravity. In the preferred embodiment, a plastic shoe provides a large contact area against the post. The shoe is urged towards the post typically by a spring, in the preferred embodiment, the spring being a horseshoe shaped, single convolution spring. A collar is provided around the shoe, spring and post holder to retain the components. A screw and optional knob provide additional locking force against the shoe and post.

In operation, if the screw is loosened, the post is constrained both vertically and axially by the force of the shoe and spring. The post may be moved both vertically and axially by hand. When in the desired position and orientation the screw may be tightened against the shoe thereby locking the post in position. The post holder permits repositioning of the post using a single hand. The screw may be loosened and then the post moved, without the need to always support the post when the screw is loosened. A further benefit of the use of the shoe is that more positive locking of the post occurs with application of less external force. The relatively large contact area of the shoe against the post greatly enhances the locking force of the post.

Accordingly, it is a principal object of this invention to provide a post holder which holds the post in the vertical direction even if no external clamping force is applied.

It is a further object of this invention to provide a post holder which is simple and relatively inexpensive to manufacture, yet which eliminates all of the aforementioned problems.

It is yet a further object of this invention to provide a post holder which is capable of true one-hand operation.

It is yet a further object of this invention to provide an improved post holder which provides more positive locking of the post, even with application of less external force.

DESCRIPTIONS OF THE DRAWINGS

DETAILED DESCRIPTION OF THE INVENTION

Figure 1:
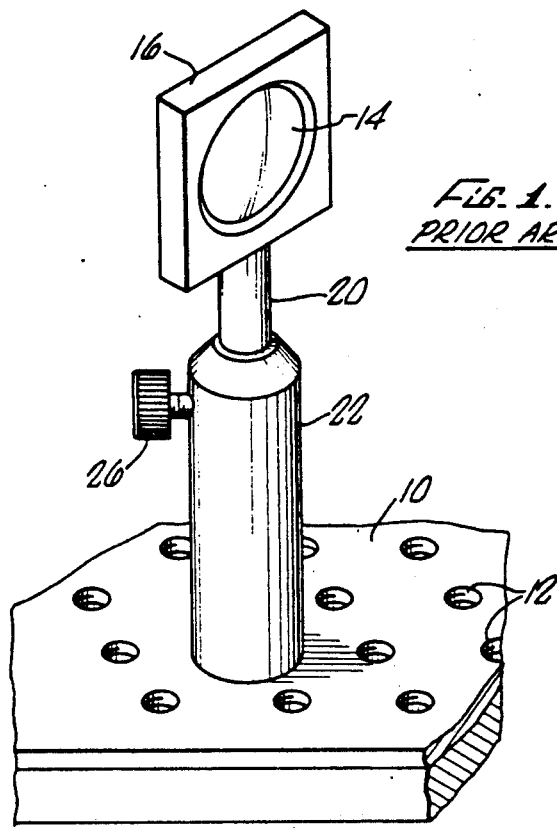
FIG. 1 shows a perspective view of a prior art post holder supporting an optical element on an optical table.
Figure 2:
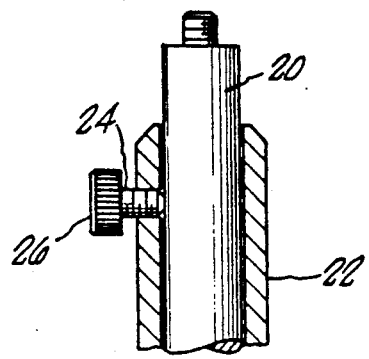
FIG. 2 is a cross sectional view of a conventional post and post holder.
Figure 3:
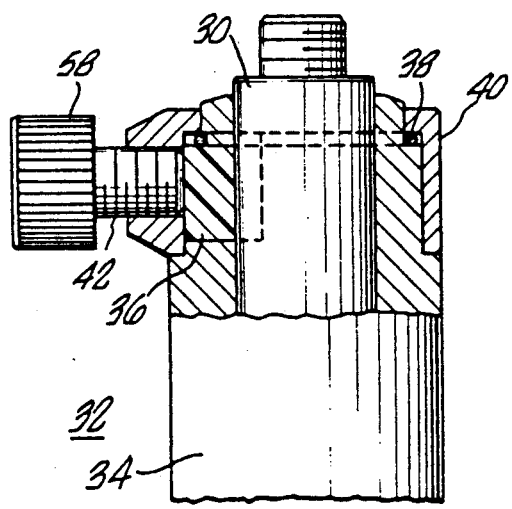
FIG. 3 is a cut away cross section of the post and post holder of this invention.

Referring to FIG. 3, a post 30 is held by the post holder 32. The post 30 is of the conventional type used in the prior art. The lower portion of the post holder 34 is of conventional single or double bore construction. The upper portion of the post holder body 34 includes a recess into which the shoe 36 contacts the post 30. In the preferred embodiment, the shoe 36 is urged towards the post 30 by a force provided by a spring 38. A collar 40 surrounds the shoe 36 and spring 38. An external clamping force may be applied by action of the screw 42 on the shoe 36.

Figure 4:
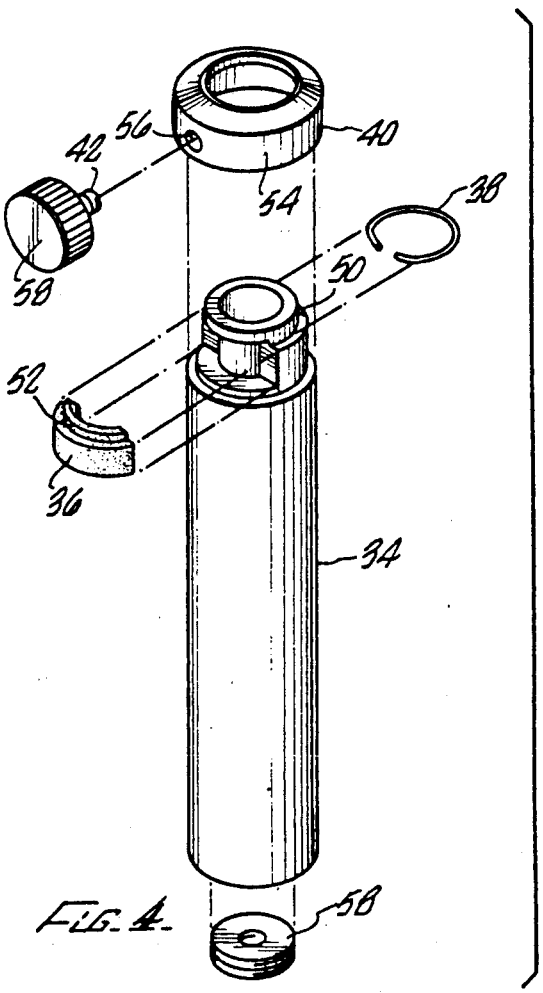
FIG. 4 is an exploded view of the post holder.

The structure and operation of each of the components will be described in more detail with respect to FIGS. 3 and 4.

The post holder body 34 may be made in either a single or double bore construction. Typically, the post holder body is machined from aluminum. Referring to FIG. 4, the post holder body 34 has a recessed region 44 into which the shoe 36 may contact the post 30. Preferably, the region 40 extends substantially around the circumference of the post 30, in the preferred embodiment providing contact of roughly one-third to one-half of the circumference of the post. A lower seat 46 is provided for contact to the bottom side of the collar 40. An upper ring 48 is formed in the top portion of the post holder body 34 to define the top of the region 44 which receives the shoe 36. A ridge 50 exists outside of the ring 48 around which the spring 38 fits. The ridge 50 is slightly lower than the bottom of the ring 48, thereby permitting the spring 38 to provide a clamping force on shoe 36. The shoe 36 has an inside face shaped to provide pressure on the post 30. A lip 52 projects out on the top portion of the shoe 36 against which the spring 38 provides a clamping force. The inside portion of the ridge 52 may be chamfered to permit easy entry of the post 30. The shoe 36 is sized to fit in the region 44, and, when the post 30 is removed, to protrude slightly into the bore in the post holder body 34.

In the assembled embodiment, the shoe 36 is held in the region 44 by action of the spring 38. The spring 38 sits on the ridge 50 and holds the shoe by pressure on the lip 52.

The shoe 36 may be formed of any suitable material for achieving the desired function. In the preferred embodiment, Delran thermoplastic is used. Such a material is strong, easy to manufacture and will not mar the post 30.

In the preferred embodiment, the spring 38 is a horseshoe shaped, single convolution spring. The desired amount of force may be varied by methods known in the art.

The collar 40 is placed around the upper portion of the post holder body 34. Optionally, an enlarged area 54 is provided in the region where the hole 56 is provided for insertion of the screw 42. A knob 58 is optionally provided for increasing the ease of torquing of the screw 42. The screw 42 may be made of any suitable material for achieving the desired function. In the preferred embodiment, Delran thermoplastic is used.

Though the invention has been described with respect to its specific preferred embodiment thereof, many variations and modifications will become apparent to those skilled in the art. It is therefore the intention that the appended claims be interpreted as broadly as possible in view to the prior art to include all such variations and modifications.

What is claimed is:

1. A post and post holder assembly comprising:
   a post holder including a recess,
   a shoe positioned in the recess,
   a spring adapted to urge the shoe towards the post, and
   a screw to lock the shoe towards the post.

2. The assembly of claim 1 wherein the shoe contacts the post over an angle of at least 45 degrees.

3. The assembly of claim 1 wherein the shoe is made of plastic.

4. The assembly of claim 1 wherein the spring is horseshoe shaped.

5. The assembly of claim 4 wherein the spring consists of a single convolution.

6. The assembly of claim 1 wherein the postholder includes a double bore.

7. In a post holder having a longitudinal bore to define a post holder wall and a hole for receiving a post, and a screw through the post holder wall to provide an external force on the post to lock the post relative to the post holder, the improvement comprising a shoe disposed through a recess in the post holder wall for providing holding force and a spring for urging the shoe towards the post even without the application of an external force through a screw.

8. An optical post holder comprising:
   a post holder including a post holder wall, the post holder wall including a recess through the wall,
   a shoe adapted to penetrate the recess through the post holder wall, the shoe having a face adapted to provide contact with a post and a lip,
   a single convolution spring disposed outside of the lip on the shoe,
   a collar surrounding the shoe, spring and recess of the post holder sidewall, and
   a screw thorough the collar to apply external force to the shoe.

* * * * *